United States Patent

Yoshinari et al.

[11] Patent Number: 6,042,921
[45] Date of Patent: Mar. 28, 2000

[54] OPTICAL RECORDING MEDIUM AND READ/WRITE METHOD THEREFOR

[75] Inventors: Jiro Yoshinari; Masanori Kosuda; Hiroshi Shingai; Shinji Miyazaki, all of Nagano, Japan

[73] Assignee: TDK Corporation, Tokyo, Japan

[21] Appl. No.: 09/131,865

[22] Filed: Aug. 10, 1998

[30] Foreign Application Priority Data

Aug. 8, 1997 [JP] Japan .................................. 9-227169
Jun. 24, 1998 [JP] Japan .................................. 10-193692

[51] Int. Cl.$^7$ ...................................................... B32B 3/00
[52] U.S. Cl. ........................ 428/64.1; 428/64.4; 428/913; 430/270.13; 430/495.1; 430/945; 369/275.1; 369/283; 369/288
[58] Field of Search .................................. 428/64.1, 64.2, 428/64.4, 913; 430/270.11, 270.13, 495.1, 945; 369/275.1, 275.2, 283, 288

[56] References Cited

U.S. PATENT DOCUMENTS 5,976,617 11/1999 Hong et al. ............................ 472/162
5,978,349 11/1999 Yoshinari et al. .................... 369/275.1

FOREIGN PATENT DOCUMENTS 63-103453 5/1988 Japan .
2-177141 7/1990 Japan .

*Primary Examiner*—Elizabeth Evans
*Attorney, Agent, or Firm*—Laubscher & Laubscher; R. J. Lasker, Esq.

[57] ABSTRACT

The invention provides a phase charge type optical recording medium comprising on both sides of a recording layer dielectric layers, each containing zinc sulfide and silicon oxide as main components. The medium comprises on a substrate 2 a first dielectric layer 31, a recording layer 4, a second dielectric layer 32 and a reflective layer 5 made up of a metal. The first dielectric layer 32 comprises a dielectric lamina 1a on a substrate 2 side thereof and a dielectric lamina 1b on a recording layer 4 side thereof. The dielectric lamina 1a has a silicon oxide content of 2 to less than 40 mol %, the dielectric lamina 1b has a silicon oxide content of 40 to 100 mol %, and the second dielectric layer 32 has a silicon oxide content of 2 to 50 mol % and a thickness of 10 to 35 nm. The number of overwritable cycles can be increased.

18 Claims, 4 Drawing Sheets

JITTERS / PEAK POWER (mW)

BIAS POWER 1 = $P_{B1T}$

13%

$P_{Pbtm1}$, $P_{11}$, $P_{21}$, $P_{Ptop1}$ $P_{11} = 1.2 \times P_{Pbtm1}$
$P_{21} = (P_{Pbtm1} + P_{Ptop1})/2$
$P_{PT} = \min(P_{11}, P_{21})$ JITTERS / BIAS POWER 1 (mW)

PEAK POWER = $P_{PT}$

13%

$P_{B1btm}$, $P_{B1O}$, $P_{B1top}$ $P_{B1O} = (P_{B1btm} + P_{B1top})/2$

JITTERS / PEAK POWER (mW)

BIAS POWER 1 = $P_{B1O}$

13%

$P_{Pbtm}$, $P_1$, $P_2$, $P_{Ptop}$ $P_1 = 1.2 \times P_{Pbtm}$
$P_2 = (P_{Pbtm} + P_{Ptop})/2$
$P_{PO} = \min(P_1, P_2)$

OPTICAL RECORDING MEDIUM AND READ/WRITE METHOD THEREFOR

BACKGROUND OF THE INVENTION

The present invention relates to a phase change type optical recording medium, and a method of overwriting the same.

Highlight is recently focused on optical recording media capable of recording information at a high density and erasing the recorded information for rewriting or overwriting. One typical rewritable optical recording medium is of the phase change type wherein the recording layer is irradiated with a laser beam to change its crystallographic state whereupon a change of reflectance by the crystallographic change is detected for reproducing. Optical recording media of the phase change type are of great interest since the optical system of the drive unit used for their operation is simpler than that for magneto-optical recording media.

Most optical recording media of the phase change type use Ge-Sb-Te base or chalcogenide materials which provide a substantial difference in reflectance between crystalline and amorphous states and have a relatively stable amorphous state.

When information is recorded on a phase change type optical recording medium, the recording layer is irradiated with laser light of power (recording power) high enough to bring the recording layer to a temperature higher than the melting point thereof. The recording layer is melted at spots with the recording power applied thereon, and then quickly cooled so that recorded marks of amorphous nature can be formed. When the recorded marks are erased, on the other hand, the recording layer is irradiated with laser light having such a relatively low power (erase power) as to bring the recording layer to a temperature higher than the crystallization temperature thereof but lower than the melting point thereof. The recorded marks with the erase power applied thereon go back to the crystalline state because they are slowly cooled down after heated to the temperature higher than their crystallization temperature. With the phase change type optical recording medium, it is thus possible to modulate the intensity of a single light beam for overwriting.

In the phase change type optical recording medium, dielectric layers are formed on both sides of the recording layer. Requirements for these dielectric layers are that:

(1) they can protect the recording layer or substrate against thermal hysteresis due to laser light irradiation, (2) they can amplify reproducing signals making use of the interference effect of light reflected at the interface of each layer, and (3) their thermal conductivity, etc. can be properly regulated to control record/erase characteristics.

For a dielectric layer meeting such requirements, a dielectric layer composed mainly of ZnS having a high refractive index is often used. For instance, JP-A 63-103453 discloses an optical information recording medium having a dielectric layer comprising a mixture of ZnS and $SiO_2$. The publication states that among the advantages of the invention there are an increase in the sensitivity to irradiation power upon recording, and an increase in the number of repetition of write/read cycles to which the dielectric material is exposed, and goes on that the sensitivity increase is due to the optimization of the heat constant of the dielectric layer, and the increase in the number of repetition of write/read cycles is due to a drop of the laser power required for recording and erasing. The publication states that the preferable $SiO_2$/($ZnS+SiO_2$) ratio is 10 to 30 mol % because the laser energy required for recording and erasure then becomes smallest.

With a phase change type optical recording medium comprising a recording layer constructed of a Ge-Sb-Te base material and dielectric layers on both sides thereof, each composed mainly of ZnS, however, the number of overwritable cycles is limited to several thousand cycles or so because of C/N drops due to repetition of overwriting. A possible leading reason for the C/N drops due to overwriting could be a composition change of the recording layer caused as by the diffusion of elements between the recording layer and the dielectric layers adjacent thereto.

JP-A 2-177141 proposes to reduce reactions between a recording layer and dielectric layers. An optical information recording medium disclosed therein comprises a recording layer for absorbing light to write information thereon and erase the information therefrom, and a protective layer located on at least one side of the recording layer, said protective layer composed primarily of a metal chalcogenide and a compound that does not form any solid solution with the chalcogenide. In the protective layer, the composition ratio varies in its thickness direction, and the proportion of the compound is increased in the vicinity of an interface where it is contiguous to the recording layer. ZnS is exemplified for the chalcogenide while $SiO_2$ is exemplified for the compound. The publication alleges that by increasing the proportion of $SiO_2$ in the protective layer in the vicinity of an interface between the protective layer and the recording layer, it is possible to reduce the reaction between the recording layer and the protective layer, thereby preventing degradation of the recording layer and, consequently, achieving millions of recording and erasing cycles in a stable manner with no reflectance change. in Example 1 therein, a first dielectric layer (of 100 nm in thickness) comprising ZnS containing 20% of $SiO_2$ is first formed on a substrate. A protective layer (of 20 nm in thickness) containing at least 90% of $SiO_2$, a Te-Ge-Sb base recording layer, the aforesaid protective layer (of 20 nm in thickness), a second dielectric layer (of 200 nm in thickness) similar to the first dielectric layer, and an NiCr reflective layer (of 40 nm in thickness) are then provided on the first dielectric layer. In Example 2 therein, a protective layer having a gradient composition where the proportion of $SiO_2$ becomes high (at least 90%) in the vicinity of the recording layer is used in place of the "dielectric layer plus protective layer" in Example 1.

However, it is now found that an optical recording medium prepared by the inventors following the examples in JP-A 2-177141 shows large jitters exceeding 13% already in an initial overwriting cycle, as can be seen from a comparative example given in the "EXAMPLE" in the present disclosure.

In connection with the optical recording medium prepared following the examples in JP-A 2-177141, it is also found that when the laser beam used for overwriting is modulated to such specific pulse patterns as depicted in FIGS. 6A and 6B, a substantial erase power margin narrows greatly upon repeated overwriting. In general, the erase power margin means an erase power range where the jitters are limited to a constant range. The erase power of a phase change type optical recording medium-driving device should be fixed at the optimum erase power according to the current standard. in actual applications, however, it varies from device to device depending on various causes such as variations in the properties of an associated optical pickup. The phase change type optical recording medium should thus have an erase power margin of width enough large to ensure interchangeability. In the optical recording medium prepared following the examples in JP-A 2-177141, however, it is found that when overwriting is repeated using laser beams according to the specific pulse patterns shown in FIGS. 6A and 6B, the upper and lower limits of the erase power margin as well as the optimum erase power are shifted to a lower power side. Consequently, the "substantial erase power margin" to be explained later becomes narrow. This in turn results in a reduction in the acceptable number of overwriting cycles.

SUMMARY OF THE INVENTION

An object of the invention is to increase the number of overwritable cycles of a phase change type optical recording medium comprising on both sides of a recording layer dielectric layer, each composed primarily of zinc sulfide and silicon oxide.

Such an object is achieved by the inventions defined below as (1) to (18).

(1) An optical recording medium comprising a phase change type recording layer on a substrate, said recording layer having a first dielectric layer in contact with a lower side thereof and a second dielectric layer in contact with an upper side thereof, wherein:

after at least 10,000 overwriting cycles, a reflectance difference between a recorded mark and an erase area is at least 80% of said reflectance difference in an initial overwriting cycle, with a jitter of up to 13%.

(2) An optical recording medium comprising a phase change type recording layer on a substrate, said recording layer having a first dielectric layer in contact with a lower side thereof and a second dielectric layer in contact with an upper side thereof, wherein:

an erase power margin after at least 10,000 overwriting cycles is at least 30% of an erase power margin in an initial overwriting cycle, and a value obtained by subtracting an optimum erase power after at least 10,000 overwriting cycles from an optimum erase power in an initial overwriting cycle is up to 1 mW, or up to 20% with respect to the optimum erase power in the initial overwriting cycle.

(3) An optical recording medium comprising a phase change type recording layer on a substrate, said recording layer having a first dielectric layer in contact with a lower side thereof and a second dielectric layer in contact with an upper side thereof, and said second dielectric layer further comprising thereon a reflective layer made up of a metal, wherein:

said first dielectric layer, and said second dielectric layer contain zinc sulfide and silicon oxide as a main component, while said first dielectric layer comprises a dielectric lamina 1a on a substrate side thereof and a dielectric lamina 1b on a recording layer side thereof, said first dielectric lamina 1a has a silicon oxide content or $SiO_2/(ZnS+SiO_2)$ of 2 mol % to less than 40 mol %, said dielectric lamina 1b has a silicon oxide content of 40 mol % to 100 mol % inclusive, and said second dielectric layer has a silicon oxide content of 2 mol % to 50 mol % inclusive, with the proviso that zinc sulfide and silicon oxide are calculated as ZnS and $SiO_2$, respectively, and said second dielectric layer has a thickness of 10 nm to 35 nm inclusive.

(4) The optical recording medium according to (3), wherein said dielectric lamina 1b has a thickness of 5 nm to 40 nm inclusive, and a ratio of a thickness $t_{1b}$ of said dielectric lamina 1b with respect to a thickness $t_1$ of said first dielectric layer, $t_{1b}/t_1$, is 0.02 to 0.5 inclusive.

(5) The optical recording medium according to (3), wherein said first dielectric layer further comprises a dielectric lamina 1c on a recording layer side of said dielectric lamina 1b, said dielectric lamina 1c having a silicon oxide content that is 2 mol % to 50 mol % inclusive and lower than that of said dielectric lamina 1b.

(6) The optical recording medium according to (3), wherein said dielectric lamina 1c has a thickness of up to 20 nm, and a ratio of a thickness $t_{1c}$ of said dielectric lamina 1c with respect to a thickness $t_1$ of said first dielectric layer, $t_{1c}/t_1$, is up to 0.2.

(7) The optical recording medium according to (3), which further comprises a second reflective layer between said second dielectric layer and said reflective layer, said second reflective layer having an extinction coefficient lower than that of said reflective layer.

(8) The optical recording medium according to (3), wherein after at least 10,000 overwriting cycles, a reflectance difference between a recorded mark and an erase area is at least 80% of said reflectance difference in an initial overwriting cycle, with a jitter of up to 13%.

(9) The optical recording medium according to (3), wherein an erase power margin after at least 10,000 overwriting cycles is at least 30% of an erase power margin in an initial overwriting cycle, and a value obtained by subtracting an optimum erase power after at least 10,000 overwriting cycles from an optimum erase power in an initial overwriting cycle is up to 1 mW, or up to 20% with respect to the optimum erase power in the initial overwriting cycle.

(10) An optical recording medium comprising a phase change type recording layer on a substrate, said recording layer having a first dielectric layer in contact with a lower side thereof and a second dielectric layer in contact with an upper side thereof, and said second dielectric layer further comprising thereon a reflective layer made up of a metal, wherein:

said first dielectric layer, and said second dielectric layer contain zinc sulfide and silicon oxide as a main component, while said first dielectric layer comprises a dielectric lamina 1a on a substrate side thereof and a dielectric lamina 1b on a recording layer side thereof and said second dielectric layer comprises a dielectric lamina 2a on a recording layer side thereof and a dielectric lamina 2b on a reflective layer side thereof, said first dielectric lamina 1a has a silicon oxide content or $SiO_2/(ZnS+SiO_2)$ of 2 mol % to less than 40 mol %, said dielectric lamina 1b has a silicon oxide content of 40 mol % to 100 mol % inclusive, said dielectric lamina 2a has a silicon oxide content of 2 mol % to 50 mol % inclusive, and said dielectric lamina 2b has a silicon oxide content that is 40 mol % to 100 mol % inclusive and higher than that of said dielectric lamina 2c, with the proviso that zinc sulfide and silicon oxide are calculated as ZnS and $SiO_2$, respectively, and said second dielectric layer has a thickness of 10 nm to 35 nm inclusive.

(11) The optical recording medium according to (10), wherein said dielectric lamina 2a has a thickness of at least 2 nm, and a ratio of a thickness $t_{2a}$ of said dielectric lamina 2a with respect to a thickness $t_2$ of said second dielectric layer, $t_{2a}/t_2$, is at least 0.05.

(12) The optical recording medium according to (10), wherein said dielectric lamina 1b has a thickness of 5 nm to 40 nm inclusive, and a ratio of a thickness $t_{1b}$ of said dielectric lamina 1b with respect to a thickness $t_1$ of said first dielectric layer, $t_{1b}/t_1$, is 0.02 to 0.5 inclusive.

(13) The optical recording medium according to (10), wherein said first dielectric layer further comprises a dielectric lamina 1c on a recording layer side of said dielectric lamina 1b, said dielectric lamina 1c having a silicon oxide content that is 2 mol % to 50 mol % inclusive and lower than that of said dielectric lamina 1b.

(14) The optical recording medium according to (13), wherein said dielectric lamina 1c has a thickness of up to 20 nm, and a ratio of a thickness $t_{1c}$ of said dielectric lamina 1c with respect to a thickness $t_1$ of said first dielectric layer, $t_{1c}/t_1$, is up to 0.2.

(15) The optical recording medium according to (10), which further comprises a second reflective layer between said second dielectric layer and said reflective layer, said second reflective layer having an extinction coefficient lower than that of said reflective layer.

(16) The optical recording medium according to (10), wherein after at least 10,000 overwriting cycles, a reflectance difference between a recorded mark and an erase area is at least 80% of said reflectance difference in an initial overwriting cycle, with a jitter of up to 13%.

(17) The optical recording medium according to (10), wherein an erase power margin after at least 10,000 overwriting cycles is at least 30% of an erase power margin in an initial overwriting cycle, and a value obtained by subtracting an optimum erase power after at least 10,000 overwriting cycles from an optimum erase power in an initial overwriting cycle is up to 1 mW, or up to 20% with respect to the optimum erase power in the initial overwriting cycle.

(18) A recording/reproducing method for overwriting an optical recording medium as recited in any one of claims 1, 2, 3 and 10, wherein:

a power level of a laser beam used for overwriting involves three levels, $P_p$ that is peak power, $P_{B1}$ that is bias power 1 lower than $P_p$, and $P_{B2}$ that is bias power 2 lower than $P_{B1}$, and a laser beam for forming a recorded mark is pulse modulated in such a way that said peak power is given by $P_p$ and bottom power is given by $P_{B2}$, and after final pulse irradiation, said power level goes down to $P_{B2}$, and then goes back to $P_{B1}$ that is an erase power level.

ACTION AND EFFECT

An optical recording medium, to which the present invention is applied, comprises a substrate 2, and a first dielectric layer 31, a phase change type recording layer 4, a second dielectric layer 32 and a reflective layer 5 made up of a metal provided thereon, as shown in FIGS. 1 to 5. The first dielectric layer 31, and the second dielectric layer 32 contain ZnS and $SiO_2$ as main components.

According to one aspect of the invention, the first dielectric layer 31 comprises a dielectric lamina 1a in the vicinity of the substrate 2 and a dielectric lamina 1b in the vicinity of the recording layer 4, as shown in FIG. 1. The dielectric lamina 1a defines an area having a relatively high ZnS content while the dielectric lamina 1b defines an area having a relatively high $SiO_2$ content. On the other hand, the second dielectric layer has a low $SiO_2$ content and a thickness of up to 35 nm. By this design, the number of overwritable cycles (the number of overwriting cycles until a jitter of 13% is exceeded) can be increased to a sufficient level because the jitters can be reduced in an initial overwriting cycle and an increase in the jitters due to repetition of overwriting can be limited. A possible reason for this increase in the number of overwritable cycles could be due to the provision between the dielectric lamina 1a and the recording layer 4 of the dielectric lamina 1b having a low content of elements (Zn, S) likely to be bonded to elements in the recording layer 4. A high proportion of the amorphous component ($SiO_2$) in the dielectric lamina 1b gives rise to a mechanical strength improvement. This, too, could contribute to the increase in the number of overwritable cycles.

The optical recording medium prepared by the inventors following the examples in JP-A 2-177141 is found to undergo some considerable jitter increase already in the initial overwriting cycle. This could be due to the fact that the total thickness of the second dielectric layer provided between the recording layer and the reflective layer is 220 nm. When the second dielectric layer is thick, the shape of the edges of recorded marks is not sharply delimited because, when the recorded marks are formed, heat radiating from spots on the recording layer upon laser beam irradiation spreads widely in the longitudinal direction of the second dielectric layer. This in turn causes the jitters to become remarkably large beyond the jitter range which the optical recording medium should satisfy. When the second dielectric layer is thick, Zn and S are likely to diffuse from the second dielectric layer to the recording layer because the cooling of the second dielectric layer is slow. According to the present invention, however, it is possible to keep the jitters enough low in the initial overwriting cycle because the thickness of the second dielectric layer is reduced to 35 nm or less. Further, Zn and S are less susceptible to diffusion to the recording layer because the second dielectric layer can be rapidly cooled. For this reason, the second dielectric layer need not have any layer having a high $SiO_2$ content, and so can be easily fabricated in a single layer form.

When the optical recording medium prepared following the examples in JP-A 2-177141 is overwritten using a laser beam according to the aforesaid specific pulse pattern, the number of overwritable cycles is reduced due to a decrease in the substantial erase power margin. In this regard, the inventors have found that this decrease in the substantial erase power margin is ascribable to the fact that the dielectric layer having a high silicon oxide content is provided contiguously to the recording layer. Stated otherwise, the inventors have found that the decrease in the substantial erase power margin experienced with the optical recording medium prepared following the examples in JP-A 2-177141 is due to the fact that the protective layer contiguous to the recording layer has a silicon oxide content as high as 90% or greater. When such specific recording pulse patterns as shown in FIGS. 6A and 6B are used in the present invention, therefore, the content of silicon oxide in the dielectric lamina 1c contiguous to the recording layer is slightly lowered. Alternatively, the dielectric lamina 1c having a relatively high ZnS content is provided on a recording layer 4 side of the dielectric lamina 1b in the first dielectric layer 31, as shown in FIG. 2.

According to another aspect of the invention, the second dielectric layer 32 is divided into a dielectric lamina 2a and a dielectric lamina 2b as shown in FIGS. 3 and 4. The dielectric lamina 2a having a relatively high ZnS content is located on the recording layer 4 side while the dielectric lamina 2b having a relatively high $SiO_2$ content is located on a reflective layer 5 side. The first dielectric layer 31 is the same as in the first aspect. In other words, the first dielectric layer 31 in accordance with the second aspect of the invention may have either a double-layer structure comprising the dielectric laminae 1a and 1b as shown in FIG. 3 or a three-layer structure comprising further the dielectric lamina 1c in addition to the laminae 1a and 1b, as shown in FIG. 4.

The second aspect of the invention is useful for cases where the second dielectric layer should be composed mainly of silicon oxide, for instance, for the purpose of adjusting its thermal conductivity. With the dielectric layer composed mainly of silicon oxide being contiguous to the recording layer, there is a decrease in the erase power margin incidental to repeated overwriting when such recording pulse patterns as shown in FIGS. 6A and 6B are used. According to the second aspect of the invention, however, it is possible to prevent any decrease in the erase power margin because the dielectric lamina 2a having a relatively low silicon oxide content is provided between the dielectric lamina 2b composed mainly of silicon oxide and the recording layer.

EXPLANATION OF THE PREFERRED EMBODIMENTS

Figure 1:
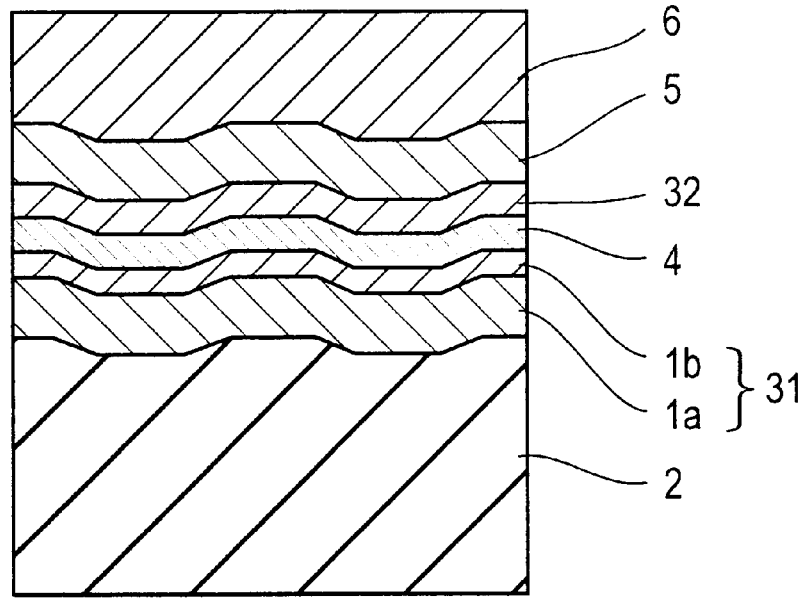
FIG. 1 is a fragmentary sectional schematic illustrative of one embodiment of the optical recording medium according to the invention.

Some preferable embodiments of the present invention will now be explained in detail.

Typical architectures of the optical recording medium according to the invention are shown in FIGS. 1, 2, 3, 4 and 5, respectively. As shown, each optical recording medium is of a single-sided (single plate) recording type medium that is provided with, in order from its surface side, a first dielectric layer 31, a recording layer 4, a second dielectric layer 32, a reflective layer 5 and a protective layer 6. The recording medium embodiment shown in FIG. 5 further includes a second reflective layer 51 between the second dielectric layer 32 and the reflective layer 5. It is here to be noted that the present invention may be applied not only to a double-sided recording type medium comprising two such single-sided recording type media bonded together at the protective layers 6, using an adhesive layer, but also to a medium comprising one such single-sided recording type medium bonded to a protective substrate, using an adhesive layer.

Substrate

In the optical recording medium of the invention, the recording layer 4 is irradiated through the substrate 2 with a light beam. It is therefore preferable that the substrate 2 is constructed of a material substantially transparent to the light beam used, for instance, a resinous or glass material. For the resin, it is preferable to use acrylic resin, polycarbonate, epoxy resin, polyolefin or the like. The shape and size of the substrate are not critical to the practice of the present invention, although the substrate is generally of disk shape having a thickness of about 0.5 to 3 mm and a diameter of about 50 to 360 mm. If required, the substrate may be provided on its surface with a grooved or other shaped pattern for tracking, and addressing purposes.

The optical recording medium of the invention is particularly suitable for high-density recording, and more particularly suitable for a (land-groove recording type of) construction wherein both grooves and lands are used as recording tracks. Preferably in this case, the recording tracks have a pitch of usually about 0.3 to 1.0 μm First Dielectric Layer 31 & Second Dielectric Layer 32 FIG. 1 Embodiment The first dielectric layer 31 is provided to prevent oxidation of the recording layer, and protect the substrate by cutting off heat that may otherwise be conducted from the recording layer to the substrate during recording. The second dielectric layer 32 is provided to protect the recording layer, and control a release of remnant heat from the recording layer after the completion of recording. Both the dielectric layers also contribute to an improvement in the degree of modulation.

The first dielectric layer 31 comprises a dielectric lamina 1a on its substrate 2 side and a dielectric lamina 1b on its recording layer 4 side.

The dielectric lamina 1a contains silicon oxide in an amount of 2 mol % to less than 40 mol %, and preferably 10 mol % to 30 mol %. When the content of silicon oxide in the dielectric lamina 1a is too high, any high C/N is hardly obtainable because of too low a refractive index. When the silicon oxide content is too low, on the other hand, the number of overwritable cycles is limited.

The dielectric lamina 1b contains silicon oxide in an amount of 40 to 100 mol %, and preferably 45 to 100 mol %. The dielectric lamina 1b is provided to reduce the diffusion of Zn and S from the dielectric lamina 1a to the recording layer 4. When the content of silicon oxide in the dielectric layer 1b is too low, it is impossible to reduce the diffusion of Zn and S to a sufficient level, resulting in a reduction in the number of overwritable cycles.

Figure 6A:
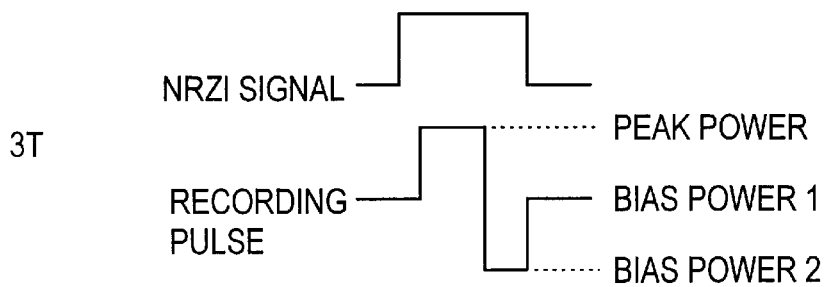
FIGS. 6(a) and 6(b) are graphs illustrative of modulation patterns for the laser beam used to overwrite the optical recording medium according to the invention.
Figure 6B:
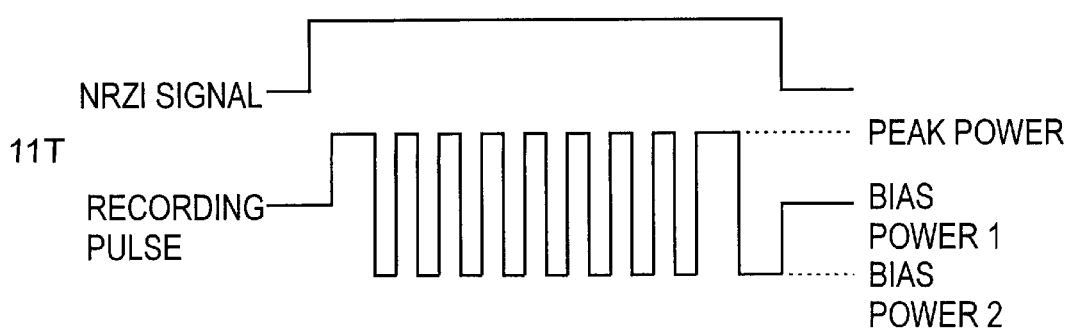

Here consider the case where recorded marks are formed for overwriting, using a pulse-modulated laser beam according to a pulse pattern shown in FIGS. 6A, and 6B. In this case, the content of silicon oxide in the dielectric lamina 1b is preferably <90 mol %, more preferably ≦80 mol %, and even more preferably ≦60 mol %. then the content of silicon oxide in the dielectric lamina 1b is too high, an erase power margin decrease takes place incidental to repetition of overwriting, resulting in a reduction in the number of overwritable cycles. When an additional dielectric lamina 1c is provided as will be described later, and shown in FIG. 2, however, no problem arises in connection with the erase power margin decrease even at a high silicon oxide content.

The first dielectric layer may be a laminate of the dielectric laminae 1a and 1b, both homogeneous. Alternatively, the first dielectric layer may have a gradient composition profile where the content of silicon oxide increases stepwise or continuously from the substrate 2 side to the recording layer 4 side. In the gradient composition profile, the boundary between an area commensurate with the dielectric lamina 1a and an area commensurate with the dielectric lamina 1b may be determined by the aforesaid content of silicon oxide. This is also true of the case where the additional dielectric lamina 1c is provided in the first dielectric layer, and the second embodiment of the invention where the second dielectric layer is divided into a dielectric lamina 2a and a dielectric lamina 2b as well.

In the architecture shown in FIG. 1, the second dielectric layer 32 has usually a homogeneous composition. Alternatively, the second dielectric layer 32 may have a composition distribution. In either case, the content of silicon oxide should be 2 to 50 mol %, and preferably 10 to 30 mol %. At too high a content of silicon oxide in the dielectric layer 32, an erase power margin decrease takes place incidental to repetition of overwriting, resulting in a reduction in the number of overwritable cycles, when a pulse-modulated beam is used according to the recording pulse pattern shown in FIGS. 6A, and 6B. When the content of silicon oxide is too low, on the other hand, the influence of the diffusion of Zn and S from the dielectric layer 32 to the recording layer becomes noticeable.

In the architecture shown in FIG. 1, the dielectric lamina 1a, the dielectric lamina 1b, and the second dielectric layer 32 should satisfy the aforesaid content of silicon oxide not only in terms of the average value but also throughout the lamina or layer. This is also true of other dielectric layer to be described later.

In the present disclosure, the content of silicon oxide is found by $SiO_2/(ZnS+SiO_2)$ with the proviso that zinc sulfide and silicon oxide are calculated as ZnS and $SiO_2$, respectively. Stated otherwise, the content of silicon oxide should be determined on the basis of the amounts of S, Zn and Si found as by fluorescent x-ray analysis. In this regard, for instance, when Zn is in excess of S or S is in excess of Zn, the content of silicon oxide should be calculated in conformity with the lesser of Zn and S on the premise that excessive Zn or S is present in the form of other compounds (ZnO, etc.) or in a free state.

The first dielectric layer 31 has a thickness of preferably 30 to 300 nm, and more preferably 50 to 250 nm. By allowing the first dielectric layer to have such a thickness, it is possible to achieve effective prevention of damage to the substrate during recording, with an increase in the degree of modulation.

The dielectric lamina 1b has a thickness of preferably 5 to 40 nm, and more preferably 5 to 30 nm. The ratio of the thickness ($t_{1b}$) of the dielectric lamina 1b to the thickness ($t_1$) of the first dielectric layer is preferably $t_{1b}/t_1$=0.02 to 0.5, and more preferably $t_{1b}/t_1$=0.05 to 04. When the dielectric layer 1b is too thin or $t_{1b}/t_1$ is too small, no sufficient improvement in the number of overwritable cycles is obtainable. When the dielectric lamina 1b is too thick or $t_{1b}/t_1$ is too large, on the other hand, any high C/N is hardly obtainable because it is impossible to make the dielectric layer 1a sufficiently thick.

The second dielectric layer 32 has a thickness of 10 to 35 nm, and preferably 13 to 25 nm. By permitting the second dielectric layer to have such a thickness, the edges of recorded marks are so clearly delimited that the jitters can be minimized, because a fast cooling rate can be achieved. Such a thickness also contributes to an increase in the degree of modulation.

Preferably, the first and second dielectric layers contain a metal element A that has a standard free energy for the formation of a sulfide thereof lower than a standard free energy for the formation of ZnS at 0 to 1,000° C. By incorporating the metal element A in the dielectric layers, it is possible to prevent S and Zn releases therefrom upon repeated overwriting cycles, thereby preventing an increase in the jitters. This in turn ensures an increase in the number of overwritable cycles.

For the metal element A, it is preferable to use at least one element selected from the group consisting of Ce, Ca, Mg, Sr, Ba, and Na, with Ce being most preferable because of its low standard free energy for the formation of its sulfide. At 300° K., for instance, the standard free energy is ca. −230 kJ/mol for the formation of ZnS, ca. −540 kJ/mol for the formation of CeS, ca. −510 kJ/mol for the formation of CaS, ca. −390 kJ/mol for the formation of MgS, ca. −500 kJ/mol for the formation of SrS, ca. −460 kJ/mol for the formation of BaS, and ca. −400 kJ/mol for the formation of $Na_2S$.

In each of the dielectric layer, the ratio of the metal element A to all metal elements is less than 2 at %, preferably up to 1.5 at %, and more preferably up to 1.3 at %. Too much metal element A is substantially ineffective for prevention of jitter increases upon repeated overwriting cycles. To make full advantage of the metal element A added, it is preferred that the proportion of the metal element A is particularly at least 0.01 at %, and more particularly at least 0.03 at %. The ratio of the metal element A to all metal elements may be determined by fluorescent x-ray analysis, EPMA (electron probe x-ray microanalysis), or the like. In the present disclosure, all metals in the dielectric layer are understood to include metalloids such as Si.

In the dielectric layer, the metal element A may be present in the form of any of a single substance, sulfide, oxide, fluoride, etc.

While an account has been given of a specific embodiment wherein the dielectric layer contains the metal element A, it is understood that an intermediate layer containing the metal element A may be interleaved between the dielectric layer and the recording layer. Such an intermediate layer, for instance, may be made up of cerium oxide ($CeO_2$) alone or a ZnS—$CeO_2$ mixture.

Each dielectric layer is preferably formed by vapor phase growth processes such as sputtering, and evaporation, with sputtering being most preferred. To obtain a gradient composition structure by means of a sputtering process, for instance, use may be made of a multi-target sputtering process wherein $SiO_2$ and ZnS are used for targets. In this process, the ratio of power inputs to the targets may be stepwise or continuously varied from the initial to final stage of film formation.

The incorporation of the metal element A in the dielectric layer may be achieved by various processes. When, for instance, Ce is used as the metal element A, the target used may comprise a major target providing a major component of the dielectric layer, on which a chip composed of Ce alone or $CeO_2$ is placed. Alternatively, $CeO_2$ or other Ce compound may be incorporated in the major target. In another target embodiment wherein Ca or Mg is used as the metal element A, a chip composed of CaO or MgO may be placed on the aforesaid major target to form a target body. However, this embodiment is not preferable because of the deliquescence of such compounds. Preferably in this case, therefore, a chip composed of $CaF_2$ or $MgF_2$ is placed on the major target to form a target body. When Sr, Ba or Na is used as the metal element A, too, it is preferable to use a fluoride chip rather than an oxide chip in view of deliquescence. Ca, Mg, Sr, Ba, and Na may be incorporated in the major target in the form of an oxide or other compound. It is noted that a composite target such as ZnS—$SiO_2$ may be used for the major target, or use may be made of a multi-target process wherein ZnS, and $SiO_2$ are independently used as the major target.

Usually, sputtering takes place in an Ar atmosphere, but it is preferable to carry out sputtering in an Ar/$O_2$ mixed atmosphere. The introduction of $O_2$ at the time of sputtering is particularly effective for carrying out sputtering while a chip composed of the metal element A alone is placed on the major target. This is also effective for the cases where a chip composed of a compound of the metal element A is placed on the major target, and a compound of the metal element A is incorporated in the major target. When the amount of $O_2$ incorporated in the sputtering atmosphere is represented by a flow ratio $O_2/(Ar+O_2)$, it is preferable that the flow ratio is particularly up to 30%, and more particularly up to 25%. The incorporation of too much $O_2$ is not preferable although it is possible to lower recording power. This is because the erase power margin becomes extremely narrow due to the erase power remaining unchanged. It is here noted that in order to make full advantage of the incorporation of $O_2$, the aforesaid flow ratio is preferably at least 5%, and more preferably at least 10%.

FIG. 2 Embodiment

Figure 2:
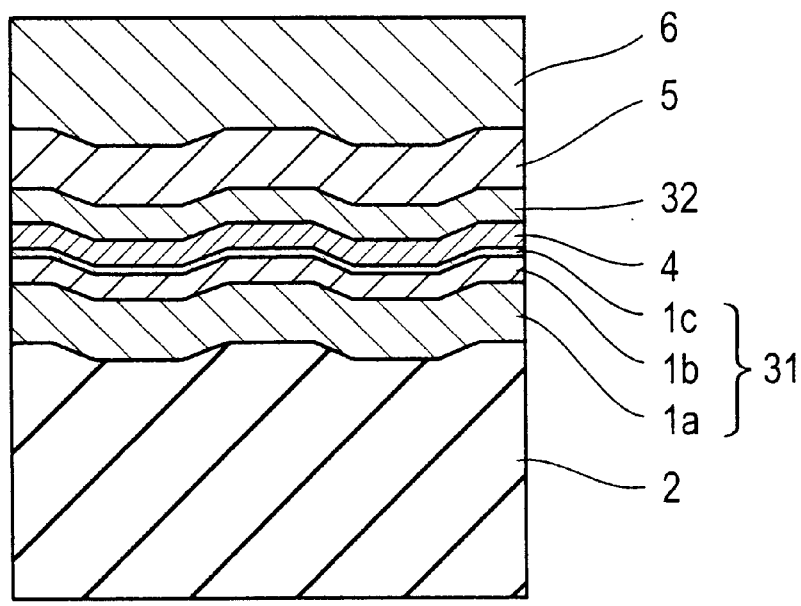
FIG. 2 is a fragmentary sectional schematic illustrative of another embodiment of the optical recording medium according to the invention.

An optical recording medium embodiment shown in FIG. 2 is the same as that shown in FIG. 1 with the exception that the first dielectric layer 31 further comprises a dielectric lamina 1c interleaved between the dielectric lamina 1b and the recording layer 4.

The content of silicon oxide in the dielectric layer 1c is 2 to 50 mol %, and lower than that in the dielectric lamina 1b. When the content of silicon oxide in the dielectric lamina 1c is too high, the effect due to the provision of the dielectric lamina 1c becomes insufficient. When the silicon oxide content is too low, on the other hand, the number of overwritable cycles is reduced due to the diffusion of Zn and S from the dielectric lamina 1c to the recording layer 4. The dielectric lamina 1c is particularly effective for the case where the dielectric lamina 1b has a high silicon oxide content of, e.g., 60 mol % or higher, and especially 80 mol % or higher. Even more preferably, the dielectric lamina 1c is used in combination with the dielectric lamina 1b having a silicon oxide content of 90 mol % or higher.

The dielectric lamina 1c has a thickness of preferably 20 nm or lower, and more preferably 10 nm or lower. The ratio of the thickness ($t_{1c}$) of the dielectric laminra 1c to the thickness ($t_1$) of the first dielectric layer is preferably $t_{1c}/t_1 \leq 0.2$, and more preferably $t_{1c}/t_1 \leq 0.1$. When the dielectric layer 1c is too thick or $t_{1c}/t_1$ is too large, the number of overwritable cycles is reduced due to the diffusion of Zn and S from the dielectric lamina 1c to the recording layer 4. To make full advantage of the effect due to the provision of the dielectric lamina 1c, on the other hand, it is preferable that the dielectric lamina 1c has a thickness of 3 nm or greater and $t_{1c}/t_1 \geq 0.01$.

The optical recording medium embodiment shown in FIG. 2 is common to that in FIG. 1 in terms of the preferable thickness range for the first dielectric layer.

FIG. 3 Embodiment

Figure 3:
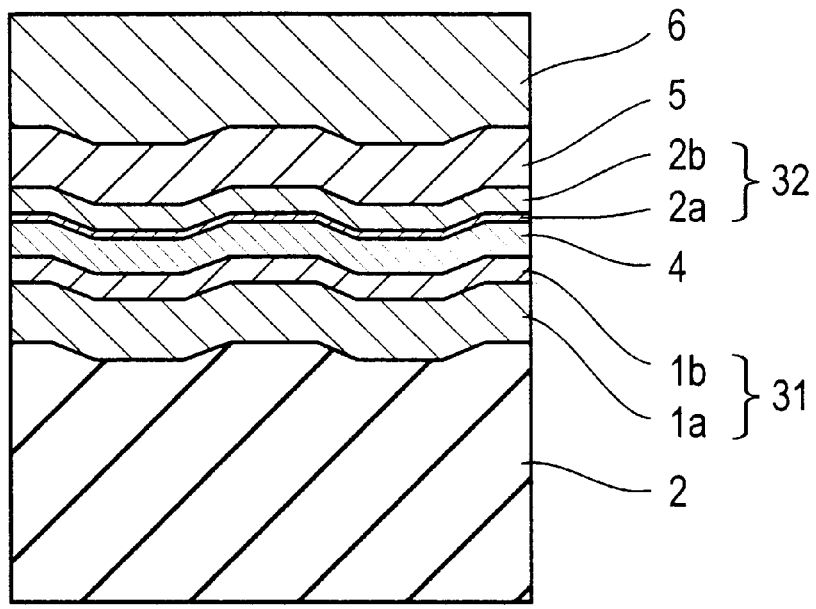
FIG. 3 is a fragmentary sectional schematic illustrative of yet another embodiment of the optical recording medium according to the invention.

An optical recording medium embodiment shown in FIG. 3 comprises a second dielectric layer 32 separated into a dielectric lamina 2a located on the side of a recording layer 4 and a dielectric lamina 2b located on the side of a reflective layer 5, and is otherwise similar to that in FIG. 1.

The dielectric lamina 2a has a silicon oxide content of 2 to 50 mol %, and preferably 10 to 30 mol %. When the silicon oxide content of the dielectric lamina 2a is too high, the erase power margin decreases upon repeated overwriting carried out according to the recording pulse pattern shown in FIGS. 6A, and 6B, resulting in a reduction in the number of overwritable cycles. When the silicon oxide content is too low, on the other hand, the diffusion of Zn and S from the dielectric lamina 2a to the recording layer 4 becomes remarkable, again resulting in a reduction in the number of overwritable cycles.

The content of silicon oxide in the dielectric lamina 2b is 40 to 100 mol %, and preferably 45 to 100 mol %, and higher than that in the dielectric lamina 2a. When the silicon oxide content of the dielectric lamina 2b does not reach 40 mol %, it is unnecessary to make the second embodiment from the embodiments of the invention, because a decrease in the erase power margin is negligibly small even in the absence of the dielectric lamina 2a. The provision of the dielectric lamina 2a is particularly effective for the case where the dielectric lamina 2b has a silicon oxide content exceeding 60 mol %, especially 80 mol %, and more especially 90 mol %.

The dielectric lamina 2a has a thickness of preferably 2 nm or greater, and more preferably 3 nm or greater. The ratio of the thickness ($t_{2a}$) of the dielectric lamina 2a to the thickness ($t_2$) of the second dielectric layer is preferably $t_{2a}/t_2 \geq 0.05$, and more preferably $t_{2a}/t_2 \geq 0.1$. When the dielectric lamina 2a is too thin or $t_{2a}/t_2$ is too small, the effect resulting from the provision of the dielectric lamina 2a becomes insufficient. In this regard, it is to be noted that when the dielectric lamina 2a is thick, it is required to make the dielectric lamina 2b thin, with the result that the feature of the dielectric lamina 2b having a high silicon oxide content is not reflected. It is thus preferable that the thickness of the dielectric lamina 2a is 15 nm or below, and especially 10 nm or below, with $t_{2a}/t_2 \leq 0.5$, and especially $t_{2a}/t_2 \leq 0.3$.

It is to be noted that the embodiment shown in FIG. 3 is common to that in FIG. 1 in terms of the thickness range for the second dielectric layer.

FIG. 4 Embodiment

Figure 4:
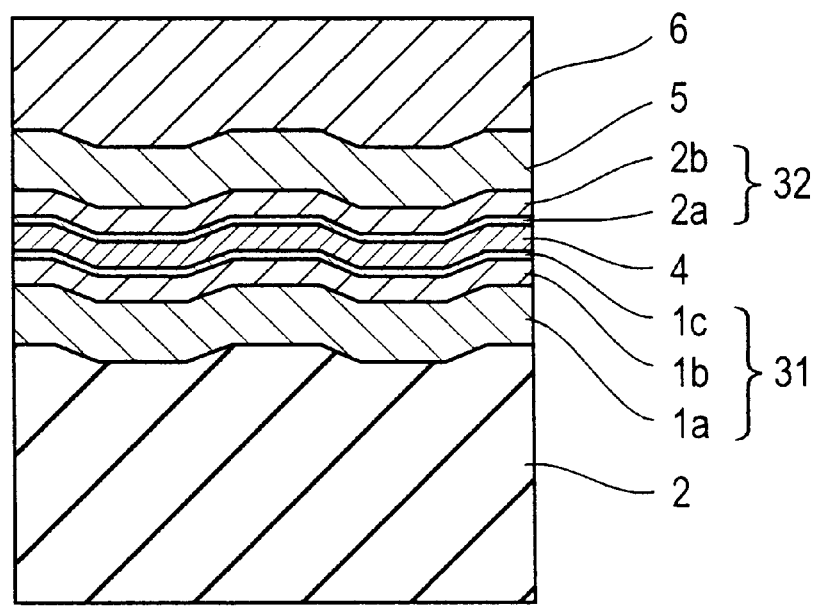
FIG. 4 is a fragmentary sectional schematic illustrative of a further embodiment of the optical recording medium according to the invention.

An optical recording medium embodiment shown in FIG. 4 comprises both the dielectric lamina 1c in FIG. 2 and the dielectric laminae 2a and 2b in FIG. 3, and is otherwise similar to that in FIG. 1.

Recording Layer 4

Insofar as the phase change type optical recording medium with the dielectric layer heated to a high temperature during recording is concerned, the advantages of the present invention are achievable irrespective of the composition of the recording layer. Thus, no specific limitation is imposed on the composition of the recording layer. However, it is understood that the present invention is very effective for optical recording media having recording layers based on Ge—Sb—Te and In—Ag—Te—Sb compositions, especially Ge—Sb—Te compositions, as explained below.

In the present invention, the atomic ratio between elements constituting a recording layer based on the Ge—Sb—Te composition is given by formula I:

$$Ge_a Sb_b Te_{1-a-b} \qquad (I)$$

Here it is preferable that $0.08 \leq a \leq 0.25$ $0.20 \leq b \leq 0.40$

When the value of a in formula I is too small, recorded marks are less susceptible to crystallization, resulting in an erase rate drop. When the value of a is too large, much Te is bonded to Ge with the result that Sb is crystallized out, making the formation of recorded marks difficult.

When the value of b in formula I is too small, the amount of Te becomes too much during storage at high temperatures to achieve reliability, because recorded marks are susceptible to crystallization. When the value of b is too large, it is difficult to form recorded marks because of the crystallization of Sb.

The recording layer based on this composition has a thickness of preferably 10 to 50 nm, and especially 14 to 50 nm. When the recording layer is too thin, the growth of a crystal phase becomes difficult, and so a reflectance change incidental to a phase change becomes insufficient. When the recording layer is too thick, on the other hand, there are drops of both reflectance and the degree of modulation.

In the present invention, the atomic ratio between elements constituting a recording layer based on the In—Ag—Te—Sb composition is given by formula II:

$$[(In_a Ag_b Te_{1-a-b})_{1-c} Sb_c]_{1-d} M_d \qquad (II)$$

Here it is preferable that
a=0.1 to 0.3
b=0.1 to 0.3
c=0.5 to 0.8
d=0 to 0.20
It is more preferable that
a=0.11 to 0.28
b=0.15 to 0.28
c=0.55 to 0.78
d=0.005 to 0.10

When the value of a in formula II is too small, the In content of the recording layer becomes relatively too small. This in turn makes the amorphism of recorded marks insufficient, resulting in a drop of the degree of modulation, and a reliability drop as well. At too large a value of a, on the other hand, the In content of the recording layer becomes relatively too high. This in turn makes the reflectance of areas other than the recorded marks low, resulting in a drop of the degree of modulation.

When the value of b in formula II is too small, the Ag content of the recording layer becomes relatively too low. This in turn makes the recrystallization of recorded marks difficult and so renders repeated overwriting difficult. At too large a value of b, on the other hand, the Ag content of the recording layer becomes relatively high, and so excessive Ag diffuses independently into an Sb phase at the time of recording or erasing. This in turn makes the robustness of the recording layer upon rewriting low, and renders the stability of both recorded marks and crystalline portions low, resulting a reliability drop. In other words, the crystallization of the recorded marks is promoted during storage at high temperatures, often resulting in drops of C/N and the degree of modulation. Repetition of recording may often facilitate deterioration in C/N and the degree of modulation.

When the value of a+b is too small, a Te phase is formed by excessive Te. The Te phase makes erasing difficult because it slows down the rate of crystal transition. When the value of a+b is too large, on the other hand, it is difficult to make the recording layer amorphous, leading to a possibility that signals may not be recorded.

When the value of c in formula II is too small, there is an increased reflectance difference concomitant with a phase change, but difficulty is involved in erasing because of an abrupt crystal transition rate drop. At too large a value of c, on the other hand, the degree of modulation becomes low due to a decreased reflectance difference incidental to the phase change.

In formula II, M represents at least one element selected from the group consisting of H, Si, C, V, W, Ta, Zn, Ti, Ce, Tb, Ge, Sn, Pb, and Y. The element M is effective for improving rewriting robustness, more specifically reducing the drop of the erasability due to repeated rewriting, and contributes to a reliability improvement under unfavorable conditions, e.g., high temperature and humidity conditions. Of these elements, it is preferable to use at least one of V, Ta, Ce, Ge and Y because their such effects are strong. Particular preference is given to at least one of V and Ta, with V being most preferred.

When the value of d representing the content of the element M is too large, no sufficient degree of modulation is obtainable because of a decreased reflectance difference concomitant with a phase change. When the value of d is too small, the effect of the element M added becomes slender.

It is preferred that the recording layer based on this composition consists essentially of Ag, Sb, Te and In, and the element or elements M added if required. In the practice of the present invention, however, it is acceptable that Ag may be partially replaced by Au, Sb may be partially replaced by Bi, Te may be partially replaced by Se, and In may be partially replaced by Al and/or P.

The percent replacement of Ag by Au is preferably up to 50 at %, and more preferably up to 20 at %. At too high a percent replacement, recorded marks are susceptible to crystallization, leading to a reliability drop at high temperatures.

The percent replacement of Sb by Bi is preferably up to 50 at %, and more preferably up to 20 at %. Too high a percent replacement causes the recording layer to have an increased coefficient of absorption, resulting in a reduction of the interference effect of light. This in turn makes the reflectance difference between crystalline and amorphous portions and hence the degree of modulation low, so failing to obtain high C/N.

The percent replacement of Te by Se is preferably up to 50 at %, and more particularly up to 20 at %. Too high a percent replacement causes the rate of crystal transition to become too low to obtain any sufficient erase rate.

The percent replacement of In by Al and/or P is preferably up to 40 at %, and more preferably up to 20 at %. Too high a percent replacement causes the stability of recorded marks to become low with a reliability drop. It is noted that Al and P may be used at any desired proportion.

The recording layer based on the aforesaid composition has a thickness of preferably 9.5 to 50 nm, and more preferably 13 to 30 nm. Too thin a recording layer makes the growth of a crystal phase difficult, and so renders a reflectance change incidental to a phase change insufficient. Too thick a recording layer, on the other hand, causes a large amount of Ag to diffuse in the recording layer in a thickness direction thereof during the formation of recorded marks. This in turn makes the proportion of Ag diffusing in a longitudinal direction of the recording layer low, resulting in a drop of the reliability of the recording layer. Too thick a recording layer gives rise to drops of both reflectance and the degree of modulation.

The composition of the recording layer may be determined by EPMA, x-ray microanalysis, ICP, or the like.

Preferably, the recording layer is formed by sputtering. Sputtering conditions are not critical to the practice of the present invention. For instance, an alloy target or a multi-target sputtering process with a plurality of targets may be used for the sputtering of a material comprising a plurality of elements.

Reflective Layer 5

The reflective layer may be formed of any desired material, usually any of high-reflectance metals or alloys of such metals, for instance, Al, Au, Ag, Pt, Cu, Ni, Cr, and Ti, and has preferably a thickness of 30 to 300 nm. At a thickness less than the lower limit of this range, it is difficult to obtain any sufficient reflectance. A thickness exceeding the upper limit of the range provides no further improvement in reflectance, and is rather unfavorable in view of costeffectiveness. Preferably, the reflective layer is formed by vapor phase growth processes such as sputtering or evaporation.

Second Reflective Layer 51

Figure 5:
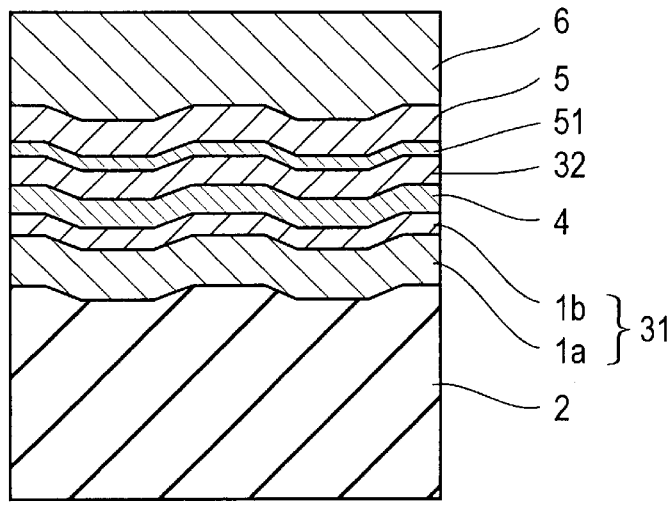
FIG. 5 is a fragmentary sectional schematic illustrative of a further embodiment of the optical recording medium according to the invention.

In FIG. 5, a second reflective layer 51 is provided between the second dielectric layer 32 and the reflective layer 5. The extinction coefficient (the imaginary part of complex refractive index) of the second reflective layer 51 is lower than that of the reflective layer 5. The provision of such a second reflective layer has been well known, as disclosed typically in JP-A 8-329525.

By making the extinction coefficient of the second reflective layer 51 lower than that of the reflective layer 5, the absorption index of amorphous (recorded mark) portions in the medium can be lower than that of crystalline portions (other than the recorded mark portions), thereby preventing the recorded marks from remaining unerased by an absorption index difference due to the presence or absence of crystallization. In this connection, it is to be noted that the extinction coefficient of the second reflective layer 51 is preferably 2 or lower while the extinction coefficient of the reflective layer 5 is preferably 3 or greater.

The second reflective layer is preferably composed mainly of a metalloid or metal. Especially, it is preferable that the second reflective layer contains Si, Ge or Si—Ge as a main component. In addition to such a main component, the second reflective layer may contain at least one element selected from Au, Ag, Cu, Al, Ni, Fe, Co, Cr, Ti, Pd, Pt, W, Ta, Mo, Sb, Bi, Dy, Cd, Mn, Mg, V, Zn, Ga, Tl, Pb, C, B. S, N. Sn, and In. It is then preferable that the content of these additives in the second reflective layer is of the order of 5 to 50 at %.

To make full advantage of the second reflective layer, it is preferable that the thickness of the second reflective layer is 30 to 120 nm.

Protective Layer 6

The protective layer is provided to improve scratch resistance and corrosion resistance. Preferably, this protective layer is formed of various organic materials. However, particular preference is given to constructing the protective layer of a radiation-curable type compound or a composition thereof, which is cured with radiation such as electron beams or ultraviolet rays. The protective layer has usually a thickness of about 0.1 to 100 $\mu$m. and may be formed by ordinary processes such as spin coating, gravure coating, spray coating, and dipping.

Adhesive Layer

Adhesives that form the adhesive layer may be not particularly critical, and so may be selected from hot-melt adhesives, ultraviolet-curing adhesives, cold-setting adhesives, tackifiers, etc.

Recording/Reproducing

The optical recording medium of the invention may be overwritten as is the case with a conventional phase change type of optical recording medium. Preferably, however, overwriting is carried out while the laser beam used for overwriting is modulated according to such patterns as mentioned below.

Modulation patterns for the laser beam preferably used herein are shown in FIGS. 6A and 6B. FIG. 6A illustrates a modulation pattern (recording pulse pattern) for the recording of 3T signals while FIG. 6B illustrates a modulation pattern for the recording of 11T signals, each with time as abscissa and the power level of the laser beam as ordinate. NRZI signal patterns for 3T and 11T are also shown in FIGS. 6A and 6B.

In each modulation pattern, the power level involves three stages, i.e., $P_p$ (peak power), $P_{B1}$ (bias power 1) lower than $P_p$, and $P_{B2}$ (bias power 2) lower than $P_{B1}$. The pulse modulation of recording power has so far been carried out in the art. In this case, however, the bottom value of a recording pulse is $P_{B1}$ that is erase power. The modulation pattern used herein is characterized in that a recording pulse has a peak value $P_p$ and a bottom value $P_{B2}$, and once the power level goes down to the bottom value $P_{B2}$ after the final pulse irradiation, it goes back to $P_{B1}$ that is an erase power level. By allowing the recording pulse to have such a pattern, it is possible to reduce an increase in the jitters because the shape of recorded marks is less susceptible to distortion even at an increased recording density.

It is to be noted that $P_p$, $P_{B1}$, and $P_{B2}$ are usually selected from the ranges of 9 to 12 mW, 4 to 6 mW, and 0 to 2 mW, respectively, although they vary depending on the composition of the recording layer, and the linear velocity of the medium.

In the present invention, the reflectance difference between the (amorphous) recorded marks and the (crystalline) erase areas after at least 10,000 overwriting cycles can be at least 80%, or even at least 90%, of the reflectance difference in an initial overwriting cycle.

According to the present invention, it is also possible to reduce an decrease in the erase power margin and a decrease in the optimum erase power, both incidental to repetition of overwriting. More specifically, the erase power margin after at least 10,000 overwriting cycles can be at least 20%, or even at least 50%, of the erase power margin in an initial overwriting cycle. Further, a value obtained by subtracting the optimum erase power after at least 10,000 overwriting cycles from the optimum erase power in an initial overwriting cycle, i.e., a decrease in the erase power can be reduced to 1 mW or less, or even 0.5 mW or less. Furthermore, the ratio of the erase power decrease to the initial optimum erase power can be reduced to 20% or less, or even 10% or less. With the optical recording medium of the invention, it is to be understood that even after 100,000 overwriting cycles, the erase power decrease and the erase power margin decrease can be avoided as mentioned above.

Figure 7A:
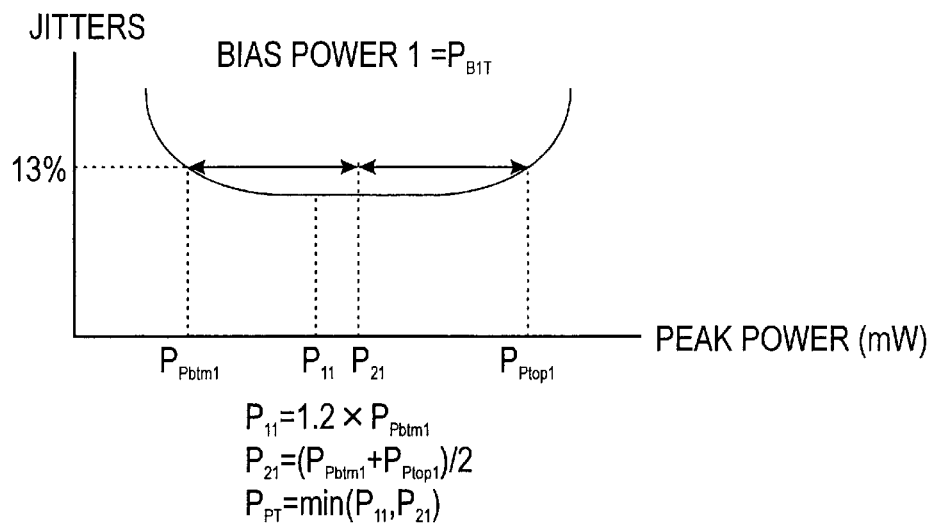
FIGS. 7(a), 7(b) and 7(c) are graphs illustrative of finding the optimum erase power and the optimum recording power.
Figure 7B:
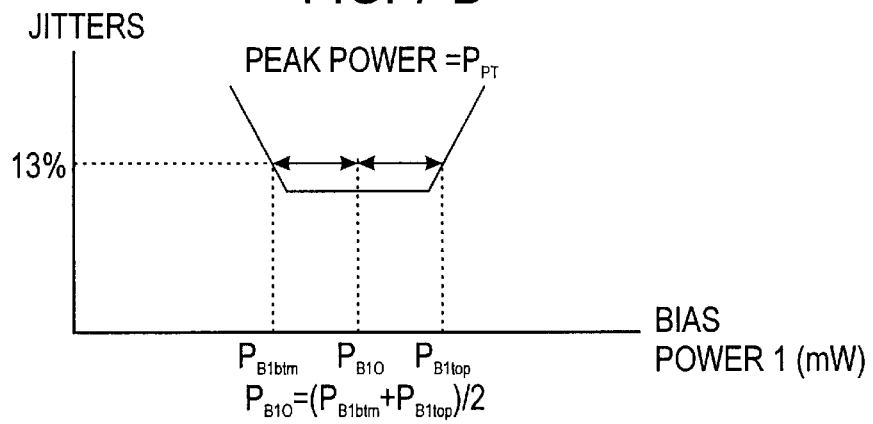
Figure 7C:
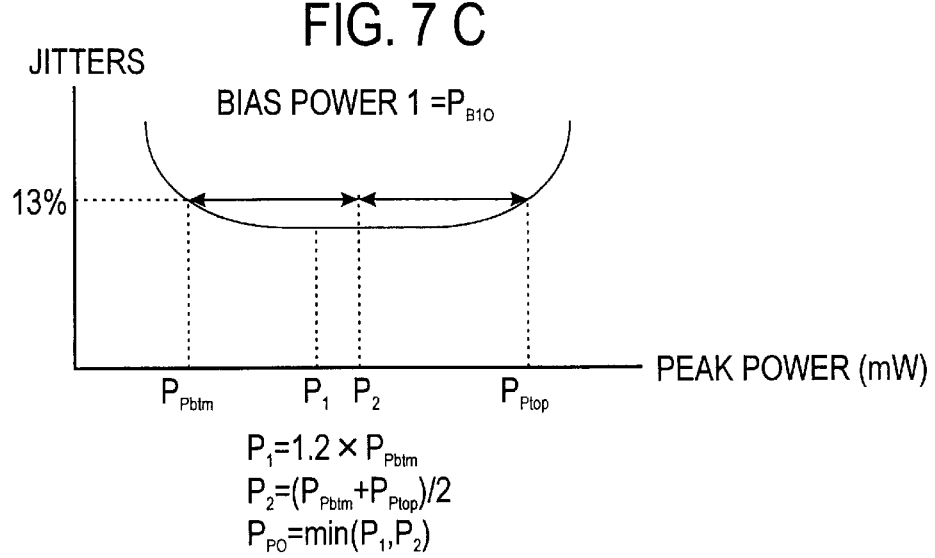

Definitions of the terms "optimum erase power" and "erase power margin" used in the present disclosure are explained with reference to FIGS. 7A, 7B and 7C. In this regard, the erase power margin explained herein is understood to refer to the aforesaid "substantial erase power margin".

The optimum erase power (optimum bias power 1) $P_{B1O}$ is found in the following procedure.

1. Set bias power 1 of a driving device at temporary bias power 1 $P_{B1T}$ (5.2 mW) as shown in FIG. 7A.

2. Perform overwriting with random data while the peak power is varied, thereby finding a jitter.

3. Find peak power $P_{Pbtm1}$ at the time when a jitter of 13% is obtained on a low power side, and find peak power $P_{Ptop1}$ at the time when a jitter of 13% is obtained on a high power side.

4. Find $P_{11}$ and $P_{12}$ by $P_{11}=1.2 \times P_{Pbtm1}$ and $P_{12}=(P_{Pbtm1}+P_{Ptop1})/2$.

5. Use the lesser [min($P_{11}$, $P_{12}$)] of $P_{11}$ and $P_{12}$ as temporary peak power $P_{PT}$.

6. Set the peak power of the driving device at $P_{PT}$ as shown in FIG. 7B.

7. Perform overwriting with random data while bias power 1 is varied, thereby finding a jitter.

8. Find bias power 1 $P_{B1btm}$ at the time when a jitter of 13% is obtained on a low power side, and find bias power 1 $P_{B1top}$ at the time when a jitter of 13% is obtained on a high power side.

9. Find the optimum bias power 1 $P_{B1O}$ by $(P_{B1btm}+P_{B1top})/2$.

Using $P_{B1O}$ obtained in the above procedure, the optimum peak power $P_{PO}$ is found in the following procedure.

1. Set bias power 1 of the driving device at $P_{B1O}$ as shown in FIG. 7C.
2. Perform overwriting with random data while the peak power is varied, thereby finding a jitter.
3. Find peak power $P_{Pbtm}$ at the time when a jitter of 13% is obtained on a low power side, and find peak power $P_{Ptop}$ at the time when a jitter of 13% is obtained on a high power side.
4. Find $P_1$ and $P_2$ by $P_1=1.2\times P_{Pbtm}$ and $P_2=(P_{Pbtm}+P_{Ptop})/2$.
5. The lesser $[\min(P_1, P_2)]$ of $P_1$ and $P_2$ gives the optimum peak power $P_{PO}$.

The erase power margin is found in the following procedure.

1. Find the optimum bias power 1 $P_{B1O}$i and the optimum peak power $P_{PO}$i in an initial overwriting cycle in the above procedure.
2. Set the peak power of the driving device at $P_{PO}$i.
3. Perform overwriting with random data while bias power 1 is varied, thereby finding a jitter.
4. Find bias power 1 $P_{B1btm}$i at the time when a Jitter of 13% is obtained on a low power side, and find bias power 1 $P_{B1top}$i at the time when a jitter of 13% is obtained on a high power side, both in the initial overwriting cycle.
5. Double the lesser $[\min(P_{B1O}\text{i}-P_{B1btm}\text{i}, P_{B1top}\text{i}-P_{B1O}\text{i})]$ of $P_{B1O}\text{i}-P_{B1btm}\text{i}$ and $P_{B1top}\text{i}-P_{B1O}\text{i}$ to obtain the erase power margin in an initial overwriting cycle.
6. Set the bias power 1 and peak power of the driving device at $P_{B1O}$i and $P_{PO}$i, respectively, thereupon performing a given number of overwriting cycles.
7. After the given number of overwriting cycles, find bias power 1 $P_{B1btm}$ow at the time when a jitter of 13% is obtained on a low power side and bias power 1 $P_{B1top}$ow at the time when a jitter of 13% is obtained on a high power side while the peak power of the driving power remains set at $P_{PO}$i.
8. Double the lesser $[\min(P_{B1O}\text{i}-P_{B1btm}\text{ow}, P_{B1top}\text{ow}-P_{B1O}\text{i})]$ of $P_{B1O}\text{i}-P_{B1btm}\text{ow}$ and $P_{B1top}\text{ow}-P_{B1O}\text{i}$ to obtain the erase power margin after repeated overwriting.

In the present disclosure, by the "initial overwriting cycle" is intended at least the 10th overwriting cycle.

In the present disclosure, the jitter is understood to refer to a clock jitter found by recording 8–16RLL signals, measuring output signals by means of a time interval analyzer (TIA), and substituting the measurement in $$\Sigma/\text{Tw} (\%)$$

where Tw is a window width.

When the optical recording medium of the invention is overwritten, no particular limitation is imposed on the linear velocity of the recording layer with respect to a laser beam. When the recording layer has the aforesaid composition, however, its linear velocity is usually about 0.8 to 20 m/s, and preferably 1.2 to 16 m/s.

Insofar as the optical recording medium of the invention is concerned, the light used for rewriting or reproducing may be freely selected from a wide wavelength region, for instance, from the range of 100 to 5,000 nm.

EXAMPLE

The present invention will now be explained more specifically with reference to some examples thereof.

Example 1

The first dielectric layer 31, recording layer 4, second dielectric layer 32, reflective layer 5 and protective layer 6 were formed on a surface of a disk form of polycarbonate substrate 2 of 120 mm in diameter and 0.6 mm in thickness in the following procedure. The substrate 2 was also provided with grooves (of 0.74 $\mu$m in width, 65 nm in depth and 1.48 $\mu$m in pitch) by co-injection molding. In this way, an optical recording disk sample having such an architecture as shown in any one of FIGS. 1 to 3 was prepared. An optical recording disk sample having the architecture as shown in FIG. 5 was also prepared by the additional provision of the second reflective layer 51.

The dielectric layer forming each of the first and second dielectric layers 31 and 32 was formed by a sputtering process in an Ar atmosphere. For the target, $ZnS-SiO_2$ or $SiO_2$ was used. The composition and thickness of each dielectric layer are shown in Table 1.

The recording layer 4 was formed by a sputtering process in an Ar atmosphere. The composition and thickness of the recording layer are shown in Table 1.

The reflective layer 5 was formed by a sputtering process in an Ar atmosphere. For the target, Al-1.7 at % Cr was used. The thickness of the reflective layer is shown in Table 1.

The second reflective layer 51 was formed by a sputtering process in an Ar atmosphere. For the target, Si was used. The thickness of the second reflective layer is shown in Table 1.

The protective layer 6 was formed by the spin coating of an ultraviolet-curable resin, and curing the resin by ultraviolet irradiation. Upon curing, the protective layer had a thickness of 5 $\mu$m.

The properties of the samples prepared in this way were estimated by placing them an optical recording medium-estimating device (operating at a wavelength of 638 nm, a numerical aperture NA of 0.6 and a linear speed of 6 m/s), and subjecting them to repeated overwriting using the following recording pulses.

Recording Pulse A

Pulse pattern: Patterns illustrated in FIGS. 6A and 6B.

Recording power (peak power): Optimum recording power in the initial overwriting cycle.

Erase power (bias power 1): Optimum erase power in the initial overwriting cycle ($P_{B1}$i shown in Table 2).

Bottom power (bias power 2): 0.5 mW.

For a sample having a jitter of greater than 13% already in the initial overwriting cycle, it is to be noted that the optimum erase power is defined by the erase power with which the jitters reach a minimum.

Recording Pulse B

Pulse pattern: Substantially similar to the pattern for recording pulse A with the exception that the bottom power is equal to the erase power (bias power 1) shown in Table 2.

For each sample, measurements were taken of the reflectance difference between the recorded marks and the erase area, the jitters, the optimum erase power, and the erase power margin in the initial overwriting cycle and after 10,000 overwriting cycles (these properties will hereinafter be called the initial properties and the post-overwriting properties). The ratio ($\Delta$Row/$\Delta$Ri) of the post-overwriting reflectance difference $\Delta$Row to the initial reflectance difference $\Delta$Ri is shown in Table 2. Values $\Delta P_{B1}$ obtained by subtracting the post-overwriting optimum erase power $P_{B1}$ow from the initial optimum erase power $P_{B1}$i as well as $\Delta P_{B1}/P_{B1}$i are shown in Table 2. The ratio (Mow/Mi) of the post-overwriting erase power margin Mow to the initial erase power margin Mi is also shown Table 2. The number of overwritable cycles for each sample was also measured. By the "number of overwritable cycles" is intended the greatest number of overwriting cycles at which the jitters are limited to 13% or below.

TABLE 1

| Sample No. | First dielectric layer or Dielectric lamina 1a ZnS:SiO$_2$ (molar ratio) | Thickness (nm) | Dielectric lamina 1b ZnS:SiO$_2$ (molar ratio) | Thickness (nm) | Dielectric lamina 1c ZnS:SiO$_2$ (molar ratio) | Thickness (nm) | Recording layer Ge:Sb:Te (atomic ratio) | Thickness (nm) |
|---|---|---|---|---|---|---|---|---|
| 1 | 85:15 | 80 | 50:50 | 5 | — | — | 2:2:5 | 20 |
| 2 | 85:15 | 75 | 50:50 | 10 | — | — | 2:2:5 | 20 |
| 3 | 85:15 | 65 | 50:50 | 20 | — | — | 2:2:5 | 20 |
| 4 | 85:15 | 55 | 50:50 | 30 | — | — | 2:2:5 | 20 |
| 5 | 85:15 | 65 | 50:50 | 20 | — | — | 2:2:5 | 20 |
| 6 | 85:15 | 65 | 35:65 | 20 | — | — | 2:2:5 | 20 |
| 7 | 85:15 | 80 | 0:100 | 5 | — | — | 2:2:5 | 20 |
| 8 | 85:15 | 75 | 0:100 | 10 | — | — | 2:2:5 | 20 |
| 9 | 85:15 | 65 | 0:100 | 20 | — | — | 2:2:5 | 20 |
| 10 | 85:15 | 55 | 0:100 | 30 | — | — | 2:2:5 | 20 |
| 11* | 85:15 | 85 | — | — | — | — | 2:2:5 | 20 |
| 12* | 85:15 | 65 | 5:95 | 20 | — | — | 2:2:5 | 20 |
| 13* | 85:15 | 65 | 63:37 | 20 | — | — | 2:2:5 | 20 |
| 14 | 85:15 | 65 | 50:50 | 20 | — | — | 2:2:5 | 20 |
| 15 | 85:15 | 65 | 50:50 | 20 | — | — | 1:2:4 | 20 |
| 16 | 85:15 | 65 | 0:100 | 20 | — | — | 1:2:4 | 20 |
| 17 | 85:15 | 65 | 0:100 | 20 | 85:15 | 5 | 1:2:4 | 20 |
| 18 | 85:15 | 65 | 0:100 | 20 | 50:50 | 5 | 1:2:4 | 20 |
| 19* | 85:15 | 65 | 5:95 | 20 | — | — | 2:2:5 | 20 |
| 20 | 85:15 | 65 | 50:50 | 20 | — | — | 2:2:5 | 20 |
| 21 | 80:20 | 70 | 50:50 | 20 | — | — | 2:2:5 | 20 |

| Sample No. | Second dielectric layer or Dielectric lamina 2a ZnS:SiO$_2$ (molar ratio) | Thickness (nm) | Dielectric lamina 2b ZnS:SiO$_2$ (molar ratio) | Thickness (nm) | Second reflective layer Thickness (nm) | Reflective layer Thickness (nm) |
|---|---|---|---|---|---|---|
| 1 | 85:15 | 20 | — | — | — | 150 |
| 2 | 85:15 | 20 | — | — | — | 150 |
| 3 | 85:15 | 20 | — | — | — | 150 |
| 4 | 85:15 | 20 | — | — | — | 150 |
| 5 | 85:15 | 20 | — | — | — | 150 |
| 6 | 85:15 | 20 | — | — | — | 150 |
| 7 | 85:15 | 20 | — | — | — | 150 |
| 8 | 85:15 | 20 | — | — | — | 150 |
| 9 | 85:15 | 20 | — | — | — | 150 |
| 10 | 85:15 | 20 | — | — | — | 150 |
| 11* | 85:15 | 20 | — | — | — | 150 |
| 12* | 5:95 | 20 | 85:15 | 200 | — | 150 |
| 13* | 85:15 | 20 | — | — | — | 150 |
| 14 | 85:15 | 20 | — | — | — | 150 |
| 15 | 85:15 | 20 | — | — | — | 150 |
| 16 | 85:15 | 20 | — | — | — | 200 |
| 17 | 85:15 | 18 | — | — | — | 200 |
| 18 | 85:15 | 18 | — | — | — | 200 |
| 19* | 5:95 | 20 | 85:15 | 15 | — | 150 |
| 20 | 85:15 | 5 | 0:100 | 25 | — | 150 |
| 21 | 80:20 | 24 | — | — | 80 | 200 |

*Comparison

TABLE 2

| Sample No. | Recording pulse | Erase power $P_{B1}i$ (mW) | $\Delta P_{B1}$ (mW) | $\Delta P_{B1}/P_{B1}i$ (%) | Erase power margin Mi (mW) | Mow/Mi (%) | $\Delta R$ ow/$\Delta R i$ | Number of overwritable cycles |
|---|---|---|---|---|---|---|---|---|
| 1 | B | 4.5 | 0 | 0 | 3 | 100 | 0.90 | >100,000 |
| 2 | B | 4.5 | 0 | 0 | 3 | 100 | 0.93 | >100,000 |
| 3 | B | 4.5 | 0 | 0 | 3 | 100 | 1.00 | >100,000 |
| 4 | B | 4.5 | 0 | 0 | 3 | 100 | 1.00 | >100,000 |
| 5 | B | 4.5 | 0 | 0 | 3 | 100 | 1.00 | >100,000 |
| 6 | B | 4.5 | 0 | 0 | 3 | 100 | 1.00 | >100,000 |
| 7 | B | 4.5 | 0 | 0 | 3 | 100 | 0.93 | >100,000 |
| 8 | B | 4.5 | 0 | 0 | 3 | 100 | 0.98 | >100,000 |

TABLE 2-continued

| Sample No. | Recording pulse | Erase power | | | Erase power margin | | | Number of overwritable cycles |
|---|---|---|---|---|---|---|---|---|
| | | $P_{B1}i$ (mW) | $\Delta P_{B1}$ (mW) | $\Delta P_{B1}/P_{B1}i$ (%) | Mi (mW) | Mow/Mi (%) | $\Delta R$ ow/$\Delta R$i | |
| 9 | B | 4.5 | 0 | 0 | 3 | 100 | 1.00 | >100,000 |
| 10 | B | 4.5 | 0 | 0 | 3 | 100 | 1.00 | >100,000 |
| 11* | B | 4.5 | — | — | 3 | 0 | 0 | ~1,000 |
| 12* | B | 3 | — | — | 0 | — | 1.00 | — |
| 13* | B | 4.5 | — | — | 3 | 0 | 0 | ~5,000 |
| 14 | A | 4.5 | 0.5 | 11 | 3 | 67 | 1.00 | >100,000 |
| 15 | A | 4.5 | 0.2 | 4 | 3 | 87 | 1.00 | >100,000 |
| 16 | A | 4.5 | 1.2 | 27 | 3 | 20 | 1.00 | ~20,000 |
| 17 | A | 4.5 | 0.25 | 6 | 3 | 83 | 0.97 | >100,000 |
| 18 | A | 4.5 | 0.45 | 10 | 3 | 70 | 0.92 | >100,000 |
| 19* | A | 4.5 | 1.5 | 33 | 3 | 0 | 1.00 | ~10,000 |
| 20 | A | 4.5 | 0 | 0 | 3 | 100 | 0.94 | >100,000 |
| 21 | A | 4.5 | 0 | 0 | 3 | 100 | 1.00 | >100,000 |

*Comparison

Tables 1 and 2 clarify the effectiveness of the invention. That is, some samples according to the invention, which were overwritten using recording pulse B, show no fluctuations in both the optimum erase power and the erase power margin at all after 10,000 overwriting cycles, and the sufficient number of overwriting cycles is achievable.

This is in sharp contrast to comparative sample No. 11 whose first dielectric layer has a high ZnS content throughout it. That is, the number of overwritable cycles is limited to barely about 1,000. Comparative sample No. 12 is a sample prepared following the examples in JP-A 2-177141. In this comparative sample, the jitters exceed 13% already in the initial overwriting cycle because the thickness of the second dielectric layer is 220 nm. In comparative sample No. 13 whose dielectric lamina 1b has too low an $SiO_2$ content, the effectiveness of the invention is not observed.

Sample Nos. 14 and 15 of the inventive samples, which were overwritten using recording pulse B, too, are found to be less susceptible to fluctuations in the erase power and erase power margin due to repetition of overwriting, and are well capable of being repeatedly overwritten. However, sample No. 16 whose dielectric lamina 1b has an $SiO_2$ content of 100% is found to be susceptible to slightly large fluctuations in the erase power and erase power margin, with a reduced number of overwritable cycles. In the case of sample Nos. 17 and 18, each further comprising the dielectric lamina 1c having a low $SiO_2$ content between the dielectric lamina 1b and the recording layer in sample No. 16, however, some considerable improvements are observed concerning fluctuations in the erase power and erase power margin, with a strikingly increased number of overwritable cycles.

Comparative sample No. 19 is a sample prepared following the examples in JP-A 2-177141. In this comparative sample, however, the thickness of the second dielectric layer is set at 35 nm so as to limit the jitters in the initial overwriting cycle to 13% or lower. This comparative sample has properties comparable to those of other samples in the initial overwriting cycle. However, it is found that when the sample is repeatedly overwritten using recording pulse A, there are large decreases in the erase power and erase power margin. Accordingly, the number of overwritable cycles is reduced.

Sample No. 20 is a sample of the second embodiment of the invention. This sample has good enough robustness upon overwriting.

Sample No. 21 is a sample to which the second reflective layer 51 shown in FIG. 5 is added. In this sample, too, the sufficient number of overwritable cycles is achievable as in other inventive samples.

The results mentioned above clarify the effectiveness of the invention.

What we claims is:

1. An optical recording medium comprising a phase change type recording layer on a substrate, said recording layer having a first dielectric layer in contact with an lower side thereof and a second dielectric layer in contact with an upper side thereof, wherein:

after at least 10,000 overwriting cycles, a reflectance difference between a recorded mark and an erase area is at least 80% of said reflectance difference in an initial overwriting cycle, with a jitter of up to 13%.

2. An optical recording medium comprising a phase change type recording layer on a substrate, said recording layer having a first dielectric layer in contact with an lower side thereof and a second dielectric layer in contact with an upper side thereof, wherein:

an erase power margin after at least 10,000 overwriting cycles is at least 30% of an erase power margin in an initial overwriting cycle, and a value obtained by subtracting an optimum erase power after at least 10,000 overwriting cycles from an optimum erase power in an initial overwriting cycle is up to 1 mW, or up to 20% with respect to the optimum erase power in the initial overwriting cycle.

3. An optical recording medium comprising a phase change type recording layer on a substrate, said recording layer having a first dielectric layer in contact with an lower side thereof and a second dielectric layer in contact with an upper side thereof, and said second dielectric layer further comprising thereon a reflective layer made up of a metal, wherein:

said first dielectric layer, and said second dielectric layer contain zinc sulfide and silicon oxide as a main component, while said first dielectric layer comprises a dielectric lamina 1a on a substrate side thereof and a dielectric lamina 1b on a recording layer side thereof, said first dielectric lamina 1a has a silicon oxide content or $SiO_2/(ZnS+SiO_2)$ of 2 mol % to less than 40 mol %, said dielectric lamina 1b has a silicon oxide content of 40 mol % to 100 mol % inclusive, and said second dielectric layer has a silicon oxide content of 2 mol % to 50 mol % inclusive, with the proviso that zinc sulfide and silicon oxide are calculated as ZnS and $SiO_2$, respectively, and said second dielectric layer has a thickness of 10 nm to 35 nm inclusive.

4. The optical recording medium according to claim 3, wherein said dielectric lamina 1b has a thickness of 5 nm to 40 nm inclusive, and a ratio of a thickness $t_{1b}$ of said dielectric lamina 1b with respect to a thickness $t_1$ of said first dielectric layer, $t_{1b}/t_1$, is 0.02 to 0.5 inclusive.

5. The optical recording medium according to claim 3, wherein said first dielectric layer further comprises a dielectric lamina 1c on a recording layer side of said dielectric lamina 1b, said dielectric lamina 1c having a silicon oxide content that is 2 mol % to 50 mol % inclusive and lower than that of said dielectric lamina 1b.

6. The optical recording medium according to claim 3, wherein said dielectric lamina 1c has a thickness of up to 20 nm, and a ratio of a thickness $t_{1c}$ of said dielectric lamina 1c with respect to a thickness $t_1$ of said first dielectric layer, $t_{1c}/t_1$, is up to 0.2.

7. The optical recording medium according to claim 3, which further comprises a second reflective layer between said second dielectric layer and said reflective layer, said second reflective layer having an extinction coefficient lower than that of said reflective layer.

8. The optical recording medium according to claim 3, wherein after at least 10,000 overwriting cycles, a reflectance difference between a recorded mark and an erase area is at least 80% of said reflectance difference in an initial overwriting cycle, with a jitter of up to 13%.

9. The optical recording medium according to claim 3, wherein an erase power margin after at least 10,000 overwriting cycles is at least 30% of an erase power margin in an initial overwriting cycle, and a value obtained by subtracting an optimum erase power after at least 10,000 overwriting cycles from an optimum erase power in an initial overwriting cycle is up to 1 mW, or up to 20% with respect to the optimum erase power in the initial overwriting cycle.

10. An optical recording medium comprising a phase change type recording layer on a substrate, said recording layer having a first dielectric layer in contact with an lower side thereof and a second dielectric layer in contact with an upper side thereof, and said second dielectric layer further comprising thereon a reflective layer made up of a metal, wherein:

said first dielectric layer, and said second dielectric layer contain zinc sulfide and silicon oxide as a main component, while said first dielectric layer comprises a dielectric lamina 1a on a substrate side thereof and a dielectric lamina 1b on a recording layer side thereof and said second dielectric layer comprises a dielectric lamina 2a on a recording layer side thereof and a dielectric lamina 2b on a reflective layer side thereof, said first dielectric lamina 1a has a silicon oxide content or $SiO_2/(ZnS+SiO_2)$ of 2 mol % to less than 40 mol %, said dielectric lamina 1b has a silicon oxide content of 40 mol % to 100 mol % inclusive, said dielectric lamina 2a has a silicon oxide content of 2 mol % to 50 mol % inclusive, and said dielectric lamina 2b has a silicon oxide content that is 40 mol % to 100 mol % inclusive and higher than that of said dielectric lamina 2a, with the proviso that zinc sulfide and silicon oxide are calculated as ZnS and $SiO_2$, respectively, and said second dielectric layer has a thickness of 10 nm to 35 nm inclusive.

11. The optical recording medium according to claim 10, wherein said dielectric lamina 2a has a thickness of at least 2 nm, and a ratio of a thickness $t_{2a}$ of said dielectric lamina 2a with respect to a thickness $t_2$ of said second dielectric layer, $t_{2a}/t_2$, is at least 0.05.

12. The optical recording medium according to claim 10, wherein said dielectric lamina 1b has a thickness of 5 nm to 40 nm inclusive, and a ratio of a thickness $t_{1b}$ of said dielectric lamina 1b with respect to a thickness $t_1$ of said first dielectric layer, $t_{1b}/t_1$, is 0.02 to 0.5 inclusive.

13. The optical recording medium according to claim 10, wherein said first dielectric layer further comprises a dielectric lamina 1c on a recording layer side of said dielectric lamina 1b, said dielectric lamina 1c having a silicon oxide content that is 2 mol % to 50 mol % inclusive and lower than that of said dielectric lamina 1b.

14. The optical recording medium according to claim 13, wherein said dielectric lamina 1c has a thickness of up to 20 nm, and a ratio of a thickness $t_{1c}$ of said dielectric lamina 1c with respect to a thickness $t_1$ of said first dielectric layer, $t_{1c}/t_1$, is up to 0.2.

15. The optical recording medium according to claim 10, which further comprises a second reflective layer between said second dielectric layer and said reflective layer, said second reflective layer having an extinction coefficient lower than that of said reflective layer.

16. The optical recording medium according to claim 10, wherein after at least 10,000 overwriting cycles, a reflectance difference between a recorded mark and an erase area is at least 80% of said reflectance difference in an initial overwriting cycle, with a jitter of up to 13%.

17. The optical recording medium according to claim 10, wherein an erase power margin after at least 10,000 overwriting cycles is at least 30% of an erase power margin in an initial overwriting cycle, and a value obtained by subtracting an optimum erase power after at least 10,000 overwriting cycles from an optimum erase power in an initial overwriting cycle is up to 1 mW, or up to 20% with respect to the optimum erase power in the initial overwriting cycle.

18. A recording/reproducing method for overwriting an optical recording medium as recited in any one of claims 1, 2, 3 and 10, wherein:

a power level of a laser beam used for overwriting involves three stages, $P_P$ that is peak power, $P_{B1}$ that is bias power 1 lower than $P_P$, and $P_{B2}$ that is bias power 2 lower than $P_{B1}$, and a laser beam for forming a recorded mark is pulse modulated in such a way that said peak power is given by $P_P$ and bottom power is given by $P_{B2}$, and after final pulse irradiation, said power level goes down to $P_{B2}$, and then goes back to $P_{B1}$ that is an erase power level.

* * * * *

UNITED STATES PATENT AND TRADEMARK OFFICE
CERTIFICATE OF CORRECTION

PATENT NO. : 6,042,921
DATED : 28 March 2000
INVENTOR(S) : Jiro Yoshinari et al.

It is certified that error appears in the above-identified patent and that said Letters Patent is hereby corrected as shown below:

On the title page, item [54].
The Title of the invention should read --

OPTICAL RECORDING MEDIUM AND RECORDING/REPRODUCING METHOD THEREFOR--

Column 24, lines 42, 43, delete "optinum" and insert --optimum--

Signed and Sealed this

Thirteenth Day of February, 2001

Attest:

NICHOLAS P. GODICI

Attesting Officer     Acting Director of the United States Patent and Trademark Office